(12) United States Patent
Liao et al.

(10) Patent No.: US 10,913,858 B2
(45) Date of Patent: Feb. 9, 2021

(54) WATERBORNE HEAT-INSULATION COATING AND COMPOSITION THEREOF

(71) Applicant: NAN YA PLASTICS CORPORATION, Taipei (TW)

(72) Inventors: Te-Chao Liao, Taipei (TW); Chun-Che Tsao, Taipei (TW); Shih-Hsun Yen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 369 days.

(21) Appl. No.: 16/003,306

(22) Filed: Jun. 8, 2018

(65) Prior Publication Data

US 2018/0362773 A1     Dec. 20, 2018

(30) Foreign Application Priority Data

Jun. 19, 2017 (TW) .............................. 106120432 A

(51) Int. Cl.
| | | |
|---|---|---|
| *C09D 5/00* | (2006.01) | |
| *C09D 133/06* | (2006.01) | |
| *F16L 59/02* | (2006.01) | |
| *C09D 5/02* | (2006.01) | |
| *C09D 133/08* | (2006.01) | |
| *C08K 3/22* | (2006.01) | |
| *C08K 3/36* | (2006.01) | |
| *C08K 3/26* | (2006.01) | |

(52) U.S. Cl.
CPC .............. *C09D 5/00* (2013.01); *C09D 5/028* (2013.01); *C09D 133/06* (2013.01); *C09D 133/08* (2013.01); *F16L 59/028* (2013.01); *C08K 3/36* (2013.01); *C08K 2003/2241* (2013.01); *C08K 2003/265* (2013.01); *C08K 2201/001* (2013.01); *C08K 2201/005* (2013.01); *C08K 2201/006* (2013.01); *C08L 2201/02* (2013.01)

(58) Field of Classification Search
CPC .......... C09D 5/00; C09D 5/022; C09D 5/027; C09D 5/028; C09D 133/03; C09D 133/08; F16L 59/028
See application file for complete search history.

(56) References Cited

FOREIGN PATENT DOCUMENTS

| | | |
|---|---|---|
| CN | 1807530 A | 7/2006 |
| CN | 1962768 A | 5/2007 |
| CN | 1990799 A | 7/2007 |

(Continued)

OTHER PUBLICATIONS

Translation for CN 106167657, Nov. 30, 2016.*

(Continued)

*Primary Examiner* — C Melissa Koslow
(74) *Attorney, Agent, or Firm* — Rosenberg, Klein & Lee

(57) ABSTRACT

A waterborne heat-insulation coating uses a silicon dioxide dispersion with silicon dioxide evenly dispersed in resin through a sol-gel method as a heat-insulation agent; since the silicon dioxide dispersion has great fineness and large specific surface area of between 30.1 and 100 m²/g, the waterborne heat-insulation coating when applied to building surfaces forms a coating layer that features a packed structure, a smooth surface, and a high surface reflectivity of 85% or more; resulted in that the coating layer can effectively block infrared rays and provide excellent thermal shielding effects, stain resistance, and durability.

8 Claims, 4 Drawing Sheets

(56) References Cited

FOREIGN PATENT DOCUMENTS

| | | | |
|---|---|---|---|
| CN | 101029206 A | | 9/2007 |
| CN | 106167657 | * | 11/2016 |
| CN | 106167657 A | | 11/2016 |
| JP | 2005179514 A | | 7/2005 |
| JP | 2006335949 A | | 12/2006 |
| JP | 2013147571 A | | 8/2013 |

OTHER PUBLICATIONS

Encyclopedia of Chemical Industry; vol. 3, Tool Materials—Power Generation / "Encyclopedia of Chemical Industry" Editorial Committee; Beijing: Chemical Industry Press, Mar. 1993; ISBN 7-5025-0840-6; pp. 959-962 of 1084 pages—translation of table 4.1 on p. 959.

* cited by examiner

WATERBORNE HEAT-INSULATION COATING AND COMPOSITION THEREOF

BACKGROUND OF THE INVENTION

1. Field of the Invention

The present invention relates to waterborne heat-insulation coating materials, and more particularly to waterborne heat-insulation coating that uses a silicon dioxide dispersion made through a sol-gel method as a heat-insulation agent.

2. Description of Related Art

Heat-insulation coating, when applied to building materials, serves to prevent solar heat from affecting the inside of buildings. For this purposes, heat-insulation coating must possess relatively high total solar reflectance (TSR) that reduces light absorption and relatively low thermal conductivity that prevents sunlight conveyed into heat from entering the building and causing raised indoor temperature.

High-TSR heat-insulation materials commonly used nowadays include hollow ceramic heat-insulation materials and heat-insulation coating materials containing beads of metal oxides. However, a hollow ceramic heat-insulation material tends to deteriorate and have heat accumulated at the material surface due to air existing in its hollow structure.

By comparison, spherical metal oxides particles in heat-insulation coating materials, such as spherical silicon dioxide particles of high sphericity, are spherical particles that are made through the flame fusion method and have high sphericity of greater than 0.7 yet a small specific surface area of below 30 m$^2$/g. The small specific surface makes the heat-insulation coating a poor barrier against infrared rays. In addition, the particle size of the spherical metal oxide particles is ranged between 0.05 and 20 μm, and this is a crucial factor that determines whether the heat-insulation coating has excellent heat-insulation effects. When the particles are too large, the resulting rough surface of the heat-insulation coating on building materials can lead to decreased TSR, and in turn inferior heat-insulation effects.

SUMMARY OF THE INVENTION

To address the foregoing problems of existing heat-insulation coating, it is a primary objective of the present invention to provide a waterborne heat-insulation coating, which uses a silicon dioxide dispersion evenly dispersed in resin and made through a sol-gel method as a heat-insulation agent, has great fineness and a relatively large specific surface area. When applied to building surfaces, the resulting heat-insulation coating layer features packed structure and high TSR for effectively blocking infrared rays and it provides excellent thermal shielding effects, stain resistance and durability.

Another primary objective of the present invention is to provide a waterborne heat-insulation coating composition is composed of components (A)-(D) below, wherein the sum of (A)-(D) amounts to 100% by weight, based on a total weight of the coating composition:

(A) a waterborne acrylic taking up 50-75 wt %;
(B) a heat-insulation agent taking up 1-10 wt %, being a silicon dioxide dispersion made through a sol-gel method and having a specific surface area ranged between 30.1 m$^2$/g and 100 m$^2$/g;
(C) inorganic powder taking up 11-35 wt %; which is one or more selected from the group consisting of titanium dioxide (TiO$_2$), aluminum hydroxide (Al(OH)$_3$), magnesium hydroxide (Mg(OH)$_2$), calcium carbonate (CaCO$_3$), calcium phosphate, calcium sulfate, aluminum oxide (Al$_2$O$_3$), zirconium dioxide, zinc oxide, talcum powder, kaolinite, expanded perlite and other pigments.
(D) auxiliary additives taking up 3-5 wt %, which is one or more selected from the group consisting of a coalescing agent, a dispersing agent, an antifoaming agent, a leveling agent, an antibacterial agent, an antifreezing agent, a photostabilizer and so on

DETAILED DESCRIPTION OF THE INVENTION

Figure 1:
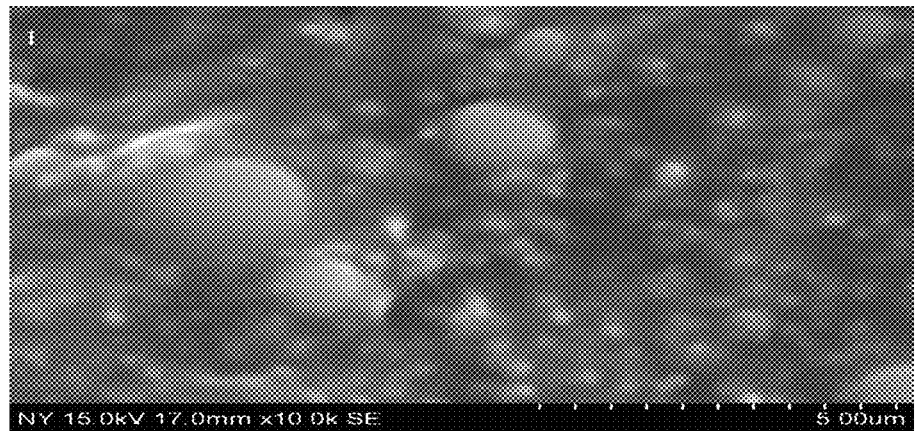
FIG. 1 is a scanning electron microscope (SEM) image obtained by using SEM to inspect the heat-insulation coating prepared by the Comparative Example 1 and after stirred by one hour.

The present invention discloses a waterborne heat-insulation coating composition, composed of components (A)-(D) below, wherein the sum of (A)-(D) amounts to 100% by weight, based on a total weight of the coating composition:

(A) a waterborne resin taking up 50-75 wt %;
(B) a heat-insulation agent taking up 1-10 wt %;
(C) inorganic powder taking up 11-35 wt %; and
(D) auxiliary additives taking up 3-5 wt %.

The waterborne resin is selected from waterborne acrylate resin, organic silicone modified acrylic resin, waterborne polyurethane (PU) resin and fluorocarbon resin, and is preferably selected from waterborne acrylate resin and organic silicone modified acrylic resin.

The key technology behind the disclosed waterborne heat-insulation coating composition is to use a silicon dioxide dispersion having a high specific surface area as its heat-insulation agent. This is different from the existing heat-insulation coating materials that contain spherical metal oxide particles with high sphericity (more than 0.7).

The heat-insulation agent in the waterborne heat-insulation coating composition of the present invention is a silicon dioxide dispersion that is made through a sol-gel method and has a specific surface area ranged between 30.1 and 100 m$^2$/g. This is different from silicon dioxide powder that is made through a flame fusion method and has a specific surface area of below 30 m$^2$/g.

In the process of preparing the waterborne heat-insulation coating, the silicon dioxide dispersion made using the sol-gel method and having good dispersivity can be evenly dispersed in resin through simple stirring, and eliminates the problem of coarse grains formed by accumulated particles, thereby simplifying the preparation and preventing effects of uneven dispersion.

Additionally, the silicon dioxide dispersion has a specific surface area ranged between 30.1 and 100 m$^2$/g, conforming to the rule that the larger specific surface of heat-insulation particles in heat-insulation coating is, the finer the particles are, the more dispersed they are in heat-insulation coating, and the evener and smoother the resulting coating surface is.

Therefore, when applied to building materials, the disclosed waterborne heat-insulation coating provides a smooth coating surface having TSR of higher than 85%. Particularly, as compared to hollow ceramic heat-insulation materials that have high material strength, the disclosed waterborne heat-insulation coating is less likely to crack due to thermal expansion and thus has longer service life.

The silicon dioxide dispersion is made using the characteristics of salt by adding hydrochloric acid into sodium silicate solution, and forming the released orthosilicic acid into colloidal silica. Then electrolyte is added into the colloid, with the pH controlled at 9-10, so as to form the silicon dioxide dispersion with water as its dispersion medium (or the gel). Its composition is a $xSiO_2 \cdot yH_2O$ compound suspending in an aqueous solution containing sodium ions or ammonium ions, with the pH controlled at 9-10, wherein each gram of the silicon dioxide dispersion has a surface area ranged between 30.1 and 100 m$^2$/g.

With excellent mobility and stability, the silicon dioxide dispersion is suitable for preparation of the disclosed waterborne heat-insulation coating composition together with the waterborne resin, the inorganic powder and the auxiliary additives.

The inorganic powder is selected from titanium dioxide ($TiO_2$), aluminum hydroxide ($Al(OH)_3$), magnesium hydroxide ($Mg(OH)_2$), calcium carbonate ($CaCO_3$), calcium phosphate ($Ca_3(PO_4)_2$), calcium sulfate, aluminum oxide ($Al_2O_3$), zirconium dioxide, zinc oxide, talcum powder, kaolinite, expanded perlite and other pigments. The inorganic powder has a particle size ranged between 0.08 and 3.0 μm, preferably ranged between 0.1 and 0.3 μm. A particle size greater than this range prevents even dispersion during stirring, yet a particle size smaller than this range can lead to excessive thixotropy, which also prevents even dispersion.

The disclosed waterborne heat-insulation coating may be prepared with various auxiliary additives added for endowing the finish coating product with good coatability and applicability. Auxiliary additives may be used include a coalescing agent, a dispersing agent, an antifoaming agent, a leveling agent, an antibacterial agent, an antifreezing agent, a photostabilizer and so on, taking up 3-5 wt % of the total weight of the coating composition.

The coalescing agent is for facilitating film formation and preventing cracks and breakage when the coating is dried. The use amount of the coalescing agent is of between 0.5-5.0 wt %. A use amount smaller than 0.5 wt % fails to prevent cracks and breakage on the dried coating layer, yet a use amount greater than 5.0 wt % can make the coating difficult to dry. The coalescing agent is at least one selected from high boiling-point solvents or plasticizers, such as glycol ether solvents, glycol ester solvents, and mixed solvents of ethylene glycol monobutyl ether and dipropylene glycol butyl ether.

The dispersing agent serves to make the inorganic powder and the heat-insulation agent evenly dispersed in resin, so as to prevent coarse grains formed by accumulated particles, the rough coating surface, and decreased surface reflectivity and heat-insulation effects. The use amount of the dispersing agent is of between 0.01 and 1.0 wt %. A use amount below 0.01 wt % can lead to uneven dispersion of the inorganic powder and the heat-insulation agent, yet a use amount greater than 1 wt % can cause excessive air bubbles during stirring, which may also lead to uneven dispersion. The dispersing agent is at least one selected from potassium polyacrylate, modified potassium polycarboxylate, glyceryl monostearate, glyceryl tristearate, oleamide, and polymer-based anionic dispersing agent.

The antifoaming agent is for eliminating air bubbles during preparation of the coating, thereby ensuring the coating quality. The use amount of the antifoaming agent is of between 0.01 and 1.0 wt %. A use amount below 0.01 wt % can lead to poor antifoaming effects, yet a use amount greater than 1.0 wt % can adversely affect the surface tension of the coating, bringing about defects during application of the coating. The antifoaming agent is selected at least one from a polysiloxane-polyether copolymer, octanol, tributyl phosphate, triphenyl phosphate, emulsified methyl silicone, emulsified phenylmethyl silicone, non-silicone mineral oil mixture containing hydrophobic particles, and modified polysiloxane.

The leveling agent is intended to eliminate various defects appearing during application of the coating, and expand the applicability of the coating, so that the coating can be applied through rolling, brushing, and spraying. The use amount of the leveling agent is of between 0.01-1.0 wt %. A use amount smaller than 0.01 wt % can lead to decreased leveling effects, yet a use amount greater than 1 wt % can change the surface tension of the coating and bring about defects on the coating surface. The leveling agent is at least one selected from acrylate copolymers and non-reactive polyethermodified polysiloxane.

The antifreezing agent is used to prevent the coating from agglomeration or freeze at low temperature, thereby expanding the applications of the coating. The antifreezing agent is at least one selected from methanol, ethanol, and glycol, with a use amount of between 0.5 and 5.0 wt %.

The antibacterial agent serves to prevent the coating from mildewing during storage or application, thereby ensuring the functions of the coating. The antibacterial agent is at least one selected from nitrite and sodium fluoride, with a use amount of between 0.01 and 1.0 wt %.

The photostabilizer provides the coating with photostability and retards photooxidation that can decay the UV shielding ability of the coating and yellow the coating. The photostabilizer is at least one selected from benzophenone-based and benzotriazole-based organic matters, with a use amount of between 0.01 and 1.0 wt %.

Samples of the waterborne heat-insulation coating made using the processes described in the examples and comparative examples below have been tested using the following testing methods for their effects.

1. Full-Wavelength Reflectivity Test (%):

The heat-insulation coating is applied to a substrate, and tested using an ultraviolet/visible light spectrophotometer (Perkin Elner Lambda 750) with 60 nm integrating spheres at the wavelength of 300-2500 nm for reflectivity. Then the reflectivity is converted to full-wavelength reflectivity % using the sunlight transmission/reflection formula.

2. Fineness Test (μm):

The coating is scraped off from the substrate using a grindometer, and the scale on the fineness gauge of the grindometer with notable appearance of the particles is visually read and the fineness of the particles (in μm) is determined accordingly.

3. Hiding Power Test:

Per Method ASTM D2805, the coating is applied between two glass plates of a hiding power tester, and the upper glass plate is slid to and fro to form an obvious border. The readings of where the D2805 appears and disappears are recorded.

4. Cross-Cut Test:

The coating is applied to a steel plate, fully dried, and cut with grids using a cross-cut tester. Adhesive tape is adhered to the grids and pulled up forcedly. When the tape leaves the steel plate completely, visual observation is performed on how the coating is peeled off from the steel plate.

5. Surface Temperature Test (° C.):

The coating is applied to a steel plate, fully dried, and lighted using a Philips 250 W CR 7 120V infrared lamp for 2 hours. The temperature at the lighted surface of the coating layer is measure using an infrared thermometer for evaluation of heat-insulation effects.

6. Thermal Conductivity Test (W/(m·° C.)):

The coating is made into film, and the ability of the coating to transmit heat is measured using a thermal conductivity analyzer with a heat source of a fixed power.

7. Thermal Transmittance (Also Known as U-Value, W/(m²·K)) Test for Thermal Barrier Coating:

Per JIS (Japanese Industrial Standards) Method A5759, when the temperature difference between the outside and the inside of the coating is 1° C., the heat radiates in 1 square meter (m²) per hour is measured.

8. QUV 1000 hrs Δb* Test:

The coating is applied to a steel plate, fully dried, placed into a UV weathering tester (ATLAS UV TEST) with UVB 313 nm and 50-60° C. and cycles of 4-hour radiation/4-hours steaming for 1000 hours, and tested using a spectrometer (X-rite color Eye 7000a) for variation in the b value, so as to determine the level of yellowing.

9. Water Resistance Test (72 Hours):

The coating is applied to a steel plate, fully dried, and immersed into water for 72 hours. The change of the coating in appearance is observed.

10 Alkali Resistance Test (Against Saturated Limewater for 72 Hours):

The coating is applied to a steel plate, fully dried, and immersed into saturated limewater for 72 hours. The change of the coating in appearance is observed.

11. Scrub Resistance Test (with 450 g Load and 0.5% Soap Solution for 2000 Times):

The coating is applied to a steel plate, fully dried, and scrubbed with 450 g load and 0.5% natural soap solution for 2000 times using a scrub tester. The change of the coating in appearance is observed.

Example 1

The coating composition was prepared using the components shown in Table 1. 60 g of waterborne acrylate resin (with a solid content of 50%) is stirred while 0.4 g of the dispersing agent, 0.65 g of the antifoaming agent, 19 g of titanium dioxide powder with a particle size of 0.3 μm, 5.1 g of calcium carbonate powder with a particle size of 0.3 μm and 4.07 g of another inorganic powder were added in sequence. After the mixture was well mixed, 7 g of the silicon dioxide dispersion made using a sol-gel method was added as the heat-insulation agent and well mixed. The mixture was set aside for letting the bubbles go. Then 3.78 g of other auxiliary additives (including 1.5 g of a coalescing agent, 0.65 g of a leveling agent, 0.08 g of an antibacterial agent, 1.07 g of an anti-freezing agent and 0.48 g of a photostabilizer) were added and mixed well to form the coating.

Figure 4:
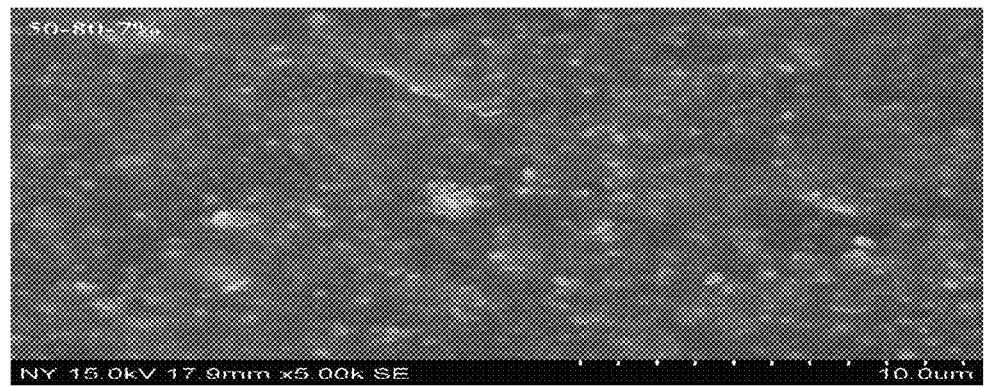
FIG. 4 is a SEM image regarding to the heat-insulation coating of the Example 1 containing 7 wt % of silicon dioxide dispersion after stirred by one hour.

After the coating composition is stirred by one hour, a scanning electron microscope (SEM) image shown as FIG. 4 is obtained by using SEM to inspect the coating so prepared by the Example.

The coating was applied to a 150 μm PET film and a steel plate using a 250 μm coating rod, and dried in the ambient temperature for 24 hours. The coating was measured for various physical properties. The results are shown in Table 1.

Example 2

The coating composition was prepared similar to the process of Example 1, but the use amount of calcium carbonate powder was 8.6 g instead of 5.1 g, and the use amount of the silicon dioxide dispersion was 3.5 g instead of 7 g.

Figure 5:
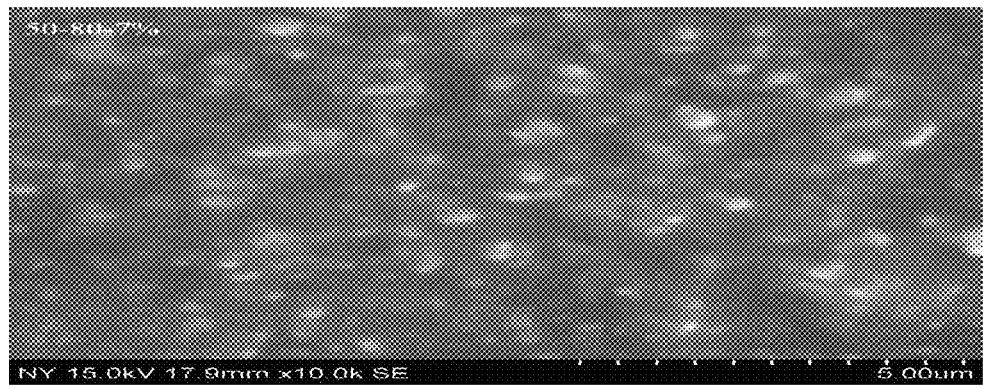
FIG. 5 is a SEM image regarding to the heat-insulation coating of the Example 2 containing 3.5 wt % of silicon dioxide dispersion after stirred by one hour.

After the coating composition is stirred by one hour, a SEM image shown as FIG. 5 is obtained by using SEM to inspect the coating so prepared by the Example.

The coating so prepared was measured for various physical properties. The results are shown in Table 1.

Example 3

The coating composition was prepared similar to the process of Example 1, but the use amount of calcium carbonate powder was 11.1 g instead of 5.1 g, and the use amount of the silicon dioxide dispersion was 1 g instead of 7 g.

The coating so prepared was measured for various physical properties. The results are shown in Table 1.

Example 4

The coating composition was prepared similar to the process of Example 2, but the silicon dioxide dispersion was further ground and fined using the grinder.

Figure 6:
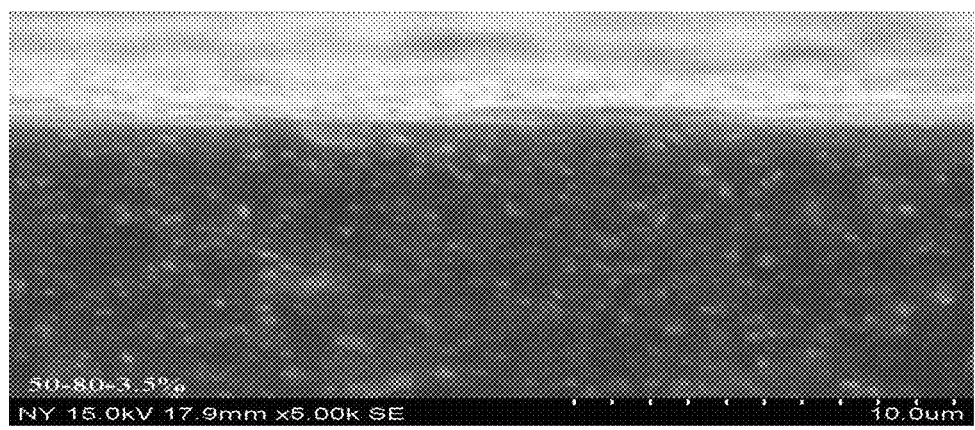
FIG. 6 is a SEM image regarding to the heat-insulation coating of the Example 4 containing 3.5 wt % of silicon dioxide dispersion after stirred by one hour.

After the coating composition is stirred by one hour, a SEM image shown as FIG. 6 is obtained by using SEM to inspect the coating so prepared by the Example.

The coating so prepared was measured for various physical properties. The results are shown in Table 1.

Example 5

The coating composition was prepared similar to the process of Example 2, but the particle size of titanium dioxide powder was 0.1 μm instead of 0.3 μm, and the particle size of calcium carbonate powder was 2.7 μm instead of 0.3 μm.

The coating so prepared was measured for various physical properties. The results are shown in Table 1.

Comparative Example 1

The coating composition was prepared similar to the process of Example 1, but 20-25 μm silicon dioxide powder made through a flame fusion method and fined using the grinder was used instead of the 15-20 μm silicon dioxide dispersion made through the sol-gel method used in Example 1.

After the coating composition is stirred by one hour, a SEM image shown as FIG. 1 is obtained by using SEM to inspect the coating so prepared by the Comparative Example.

Figure 2:
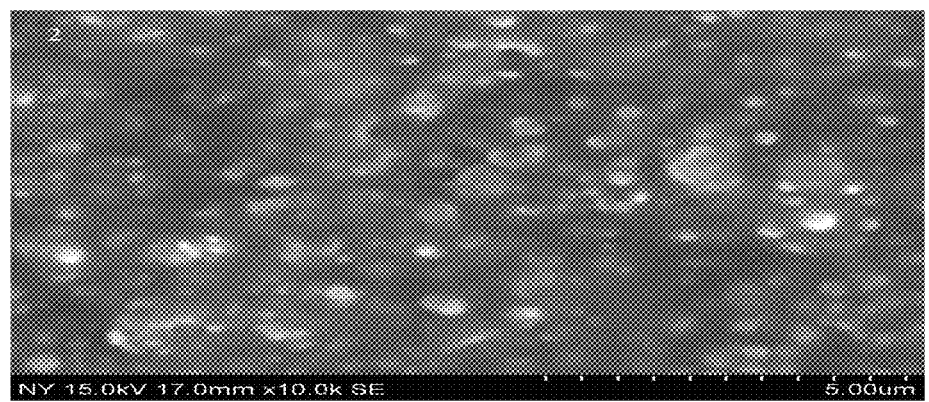
FIG. 2 is a SEM image regarding to the heat-insulation coating of the Comparative Example 1 further ground for one hour.
Figure 3:
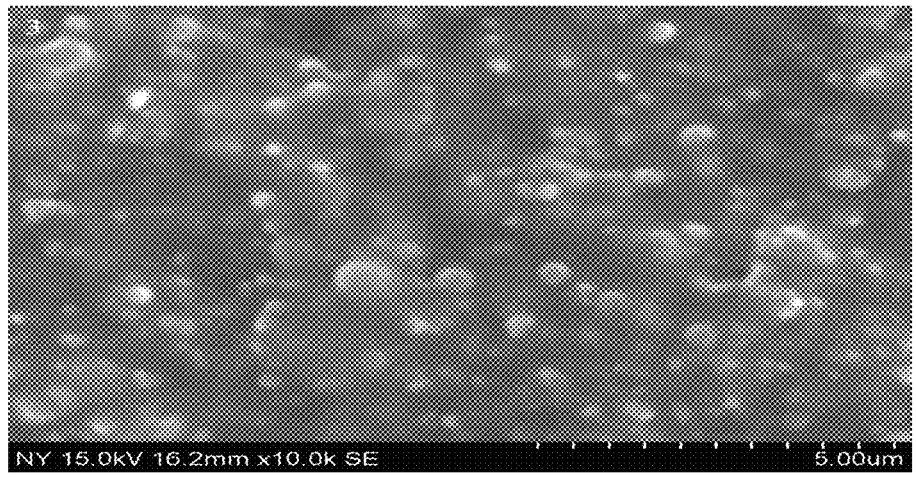
FIG. 3 is a SEM image regarding to the heat-insulation coating of the Comparative Example 1 further ground for two hours.

The SEM images of the coating further ground for 1 hour and 2 hours are shown in FIG. 2 and FIG. 3, respectively.

The coating so prepared was measured for various physical properties. The results are shown in Table 1.

Comparative Example 2

The coating composition was prepared similar to the process of Comparative Example 1, but silicon dioxide powder was not fined using the grinder, so the fineness was higher than 100 μm.

The coating so prepared was measured for various physical properties. The results are shown in Table 1.

Comparative Example 3

The coating composition was prepared similar to the process of Example 4, but the particle size of calcium carbonate powder was 2.7 μm instead of 0.3 μm, and 20-25 μm silicon dioxide powder made through the flame fusion method and fined using the grinder was used instead of the 15-20 μm silicon dioxide dispersion made through the sol-gel method in Example 4.

The coating so prepared was measured for various physical properties. The results are shown in Table 1.

Comparative Example 4

The coating composition was prepared similar to the process of Example 1, but the coating contained no calcium carbonate powder, and the use amount of the silicon dioxide dispersion was 12.1 g instead of 7 g.

The coating so prepared was measured for various physical properties. The results are shown in Table 1.

Comparative Example 5

The coating composition was prepared similar to the process of Example 1, but 3M hollow glass spheres K37 (40 μm) were used instead of the silicon dioxide dispersion made through the sol-gel method in Example 1. The coating so prepared was tested for various physical properties.

Figure 7:
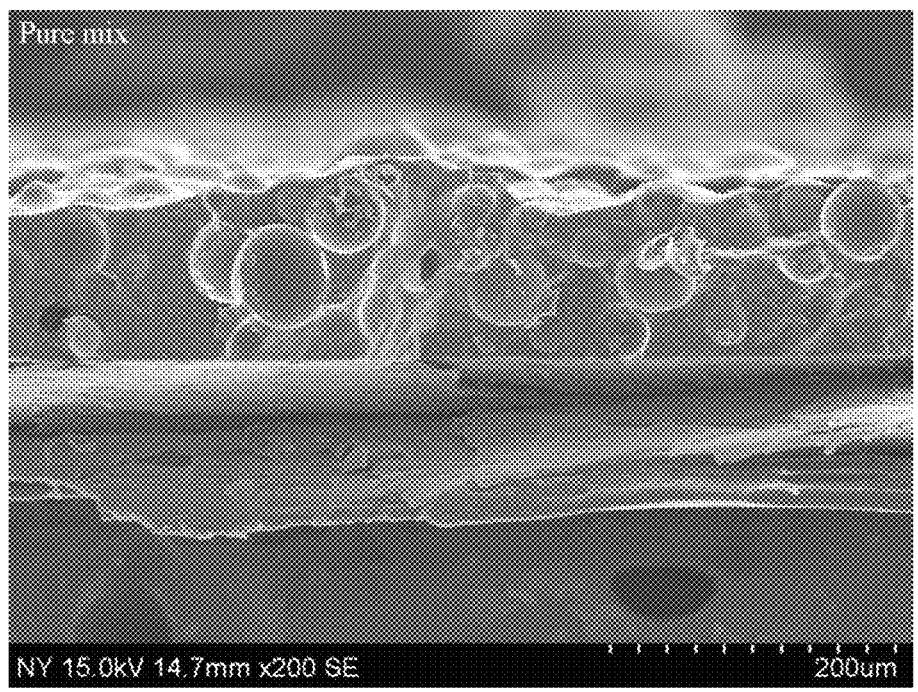
FIG. 7 is a SEM image regarding to the heat-insulation coating of the Comparative Example 5 containing 7.0 wt % of hollow glass spheres having a 40 μm in diameter and after stirred by one hour.

After the coating composition is stirred by one hour, a SEM image shown as FIG. 7 is obtained by using SEM to inspect the coating so prepared by the Comparative Example.

Figure 8:
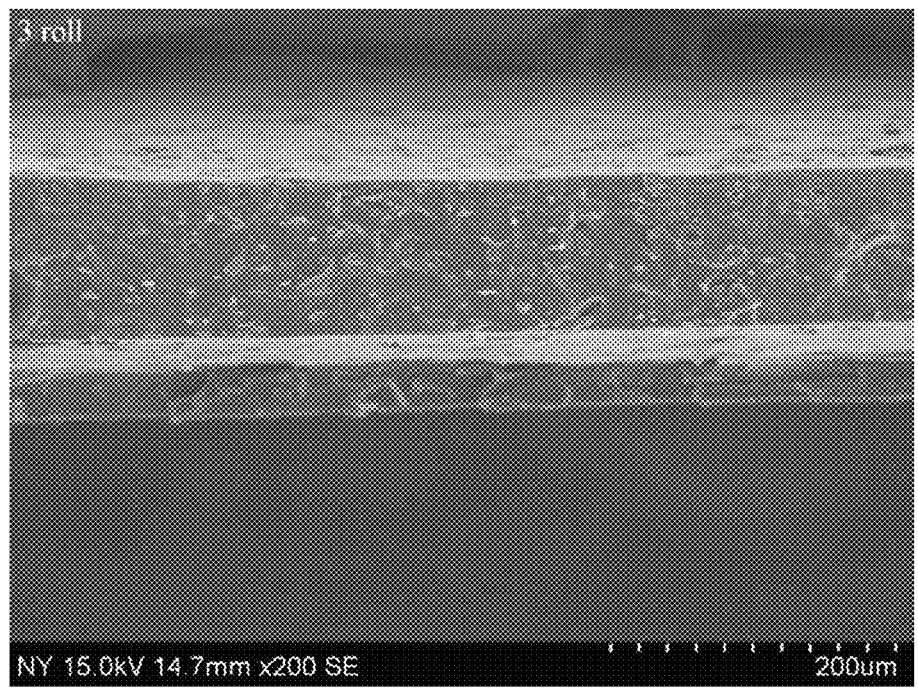
FIG. 8 is a SEM image regarding to the heat-insulation coating of the Comparative Example 5 further ground for one hour.

The SEM image of the coating further ground for one hour is shown in FIG. 8.

The coating so prepared was measured for various physical properties. The results are shown in Table 1.

TABLE 1

Components (in gram) and physical properties thereof

|  |  | Example | | | | | Comparative Example | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
|  | Component | | | | | | | | | | |
| Resin | Waterborne acrylic | 60 | 60 | 60 | 60 | 60 | 60 | 60 | 60 | 60 | 60 |
| Inorganic Powder | 0.3 μm TiO$_2$ | 19 | 19 | 19 | 19 | — | 19 | 19 | 19 | 19 | 19 |
|  | 0.1 μm TiO$_2$ | — | — | — | — | 19 | — | — | — | — | — |
|  | 0.3 μm CaCO$_3$ | 5.1 | 8.6 | 11.1 | 8.6 | — | 5.1 | 5.1 | — | — | 5.1 |
|  | 2.7 μm CaCO$_3$ | — | — | — | — | 8.6 | — | — | 8.6 | — | — |
|  | Other | 4.07 | 4.07 | 4.07 | 4.07 | 4.07 | 4.07 | 4.07 | 4.07 | 4.07 | 4.07 |
| Heat-insulating Agent | SiO$_2$ dispersion[1] | 7 | 3.5 | 1 | 3.5 | 3.5 | — | — | — | 12.1 | — |
|  | SiO$_2$ powder[2] | — | — | — | — | — | 7 | 7 | 3.5 | — | — |
|  | 40 μm hollow glass spheres | — | — | — | — | — | — | — | — | — | 7 |
| Auxiliary Additives | Coalescing agent | 1.5 | 1.5 | 1.5 | 1.5 | 1.5 | 1.5 | 1.5 | 1.5 | 1.5 | 1.5 |
|  | Dispersing agent | 0.4 | 0.4 | 0.4 | 0.4 | 0.4 | 0.4 | 0.4 | 0.4 | 0.4 | 0.4 |
|  | Antifoaming agent | 0.65 | 0.65 | 0.65 | 0.65 | 0.65 | 0.65 | 0.65 | 0.65 | 0.65 | 0.65 |
|  | Leveling agent | 0.65 | 0.65 | 0.65 | 0.65 | 0.65 | 0.65 | 0.65 | 0.65 | 0.65 | 0.65 |
|  | Antibacterial agent | 0.08 | 0.08 | 0.08 | 0.08 | 0.08 | 0.08 | 0.08 | 0.08 | 0.08 | 0.08 |
|  | Antifreezing agent | 1.07 | 1.07 | 1.07 | 1.07 | 1.07 | 1.07 | 1.07 | 1.07 | 1.07 | 1.07 |
|  | Photostabilizer Coating composition | 0.48 | 0.48 | 0.48 | 0.48 | 0.48 | 0.48 | 0.48 | 0.48 | 0.48 | 0.48 |
| Mode of Forming | Stirring | yes | yes | yes | — | yes | — | yes | — | yes | — |
|  | Grinder | — | — | — | yes | — | yes | — | yes | — | yes |
| Physical Property | Full-wavelength reflectivity (%) | 88.4 | 88.1 | 88.9 | 88.2 | 88.1 | 84.4 | 80.1 | 84.3 | 88.2 | 70.2 |
|  | SiO2 fineness (μm) | 15-20 | 15-20 | 15-20 | 15-20 | 15-20 | 20-25 | 100↑ | 15-20 | 15-20 | 15-20 |

TABLE 1-continued

Components (in gram) and physical properties thereof

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Hiding power | | 17 | 16 | 17 | 17 | 15 | 16 | 15 | 17 | 17 | 15 |
| Cross-cut | | No peel off | No peel off | No peel off | No peel off | No peel off | No peel off | little peel off | No peel off | No peel off | little peel off |
| Surface temperature (° C.) | | 61-63 | 61-63 | 61-63 | 61-63 | 61-63 | 62-64 | 64-67 | 67-70 | 64-67 | 67-70 |
| Thermal conductivity (W/m · ° C.) | | 0.43 | 0.42 | 0.42 | 0.43 | 0.43 | 0.44 | 0.51 | 0.48 | 0.44 | 0.51 |
| Thermal transmittance (W/m² · K) | | 6.09 | 6.08 | 6.09 | 6.09 | 6.09 | 6.14 | 6.09 | 6.09 | 6.14 | 6.23 |
| QUV 1000 hrs Δb* | | 0.02 | 0.03 | 0.02 | 0.02 | 0.02 | 0.03 | 0.03 | 0.02 | 0.02 | 0.05 |
| Water resistance (72 hours) | | No change in appearance | | | | | No change in appearance | | | | |
| Alkali resistance | | No change in appearance | | | | | No change in appearance | | | | |
| Scrub resistance | | No change in appearance | | | | | No change in appearance | | | | |
| Heat insulation when applied to building material surface | | Good | Good | Good | Good | Good | Fair | Poor | Poor | Fair | Poor |

Note:
[1]SiO$_2$ dispersion was made using the sol-gel method;
[2]SiO$_2$ powder was made using the flame fusion method.

Results
1. The heat-insulation coating samples of Examples 1 through 3 used 1-7 g of the silicon dioxide dispersion made through the sol-gel method as the heat-insulation agent. They all had full-wavelength reflectivity more than 88% and lighted surface temperature around 61-63° C., demonstrating their good heat-insulation effects.
2. The heat-insulation coating samples of Examples 2, 4 and 5 used 3.5 g of the silicon dioxide dispersion made through the sol-gel method as the heat-insulation agent. Despite that the sample of Example 5 was made using 2.7 μm calcium carbonate powder, and that some of the samples were not further ground and fined, the resulting fineness of the silicon dioxide was between 15 and 20 μm, and all the samples had full-wavelength reflectivity more than 88% and lighted surface temperature around 61-63° C. This demonstrates that during preparation of the disclosed heat-insulation coating stirring is sufficient to evenly disperse the nano-scale silicon dioxide particles in the resin, so as to simplify the preparation and reduce impact of uneven dispersion.
3. The difference between Comparative Examples 1 and 2 is that when the silicon dioxide powder made through the flame fusion method was used for preparing the heat-insulation coating as the heat-insulation agent, the silicon dioxide powder of Comparative Example 1 had to be ground and fined using the grinder for better dispersion or the silicon dioxide powder particles would not be evenly dispersed in the resin but accumulate into coarse grains like seen in Comparative Example 2 whose fineness was higher than 100 μm. The rough coating surface decreased the surface reflectivity to 80%, so the lighted surface temperature increased to 67-70° C., meaning that the heat-insulation effects were inferior.
Additionally, Comparative Example 3 used silicon dioxide powder made through the flame fusion method with a reduced use amount of 3.5%, so the lighted surface temperature was increased to 67-70° C. This demonstrates that when the heat-insulation coating uses silicon dioxide powder made through the flame fusion method as heat-insulation particles, good heat-insulation effects can only be obtained with sufficient use of the silicon dioxide powder.
4. The heat-insulation coating of Comparative Example 4 contained no calcium carbonate powder but used 12.1 g of the silicon dioxide dispersion made through the sol-gel method as the heat-insulation agent. As a result, the lighted surface temperature of the heat-insulation coating was increased to 64-67° C., equivalent to the heat-insulation effects of the heat-insulation coating of Comparative Example 2 that did not use silicon dioxide dispersion. This demonstrates that:
   1) When the silicon dioxide dispersion is used excessively in the heat-insulation coating, the silicon dioxide tends to agglomerate in the coating leading to uneven particle dispersion and inferior heat-insulation effects; and
   2) When the use amount of the silicon dioxide dispersion is between 1-10 wt % of the total weight of the heat-insulation coating, during preparation of the heat-insulation coating, only stirring is enough to evenly disperse the nano-scale silicon dioxide particles in the resin, and the resulting heat-insulation coating has good heat insulation.
5. The heat-insulation coating of Comparative Example 5 used 7 wt % of hollow glass spheres with a particle size of 40 μm as the heat insulating agent. During stirring, uneven dispersion of the glass spheres in the resin could be observed with naked eyes. After the use of the grinder, while there were no obvious particles visually observed, the surface reflectivity of the heat-insulation coating was decreased to 70% and the lighted surface temperature was as high as 67-70° C. As can be observed from the SEM image of FIG. 8, the hollow glass spheres are broken, leading to degraded surface reflectivity and heat-insulation effects. This demonstrates that the commercially available heat-insulation coating using hollow glass spheres as the heat-insulation agent when used to coat the surfaces of building materials, the hollow glass spheres tend to be affected by external stress factors because they are not strong enough, and thus the coating has to be reapplied regularly.

What is claimed is:

1. waterborne heat-insulation coating composition, composed of components (A)-(D) below, wherein the sum of (A)-(D) amounts to 100% by weight, based on a total weight of the coating composition:
   (A) a waterborne resin taking up 50-75 wt %, selected from waterborne acrylate resin, organic silicone modified acrylic resin, waterborne polyurethane (PU) resin and fluorocarbon resin;
   (B) a heat-insulation agent taking up 1-10 wt %; being a silicon dioxide dispersion made through a sol-gel method and having a specific surface area of between 30.1 and 100 m.sup.2/g
   (C) inorganic powder having a particle size ranged between 0.08 and 3.0 μm and taking up 11-35 wt %; being one or more selected from $TiO_2$, $Al(OH)_3$, $Mg(OH)_2$, $CaCO_3$, $Ca_3(PO_4)_2$, $CaSO_4$, $Al_2O_3$, $ZrO_2$, ZnO, talc, kaolinite, and expanded perlite; and
   (D) auxiliary additives taking up 3-5 wt %; being one or more selected from the group consisting of a coalescing agent, a dispersing agent, an antifoaming agent, a leveling agent, an antibacterial agent, an antifreezing agent and a photostabilizer.

2. The waterborne heat-insulation coating composition as defined in claim 1, wherein silicon dioxide dispersion is a $xSiO_2 \cdot yH_2O$ compound suspending in an aqueous solution containing sodium ions or ammonium ions, and the solution has a pH controlled at 9-10.

3. The waterborne heat-insulation coating composition as defined in claim 1, wherein the inorganic powder has a particle size ranged between 0.1 and 0.3 μm.

4. The waterborne heat-insulation coating composition as defined in claim 1, wherein the coalescing agent has a use amount ranged between 0.5 and 5.0 wt %, and is one or more selected from the group consisting of glycol ether solvents, glycol ester solvents, and mixed solvents of ethylene glycol monobutyl ether and dipropylene glycol butyl ether.

5. The waterborne heat-insulation coating composition as defined in claim 1, wherein the dispersing agent has a use amount ranged between 0.01 and 1.0 wt %, and is one or more selected from the group consisting of potassium polyacrylate, modified potassium polycarboxylate, glyceryl monostearate, glyceryl tristearate, oleamide, and polymer-based anionic dispersing agent.

6. The waterborne heat-insulation coating composition as defined in claim 1, wherein the antifreezing agent has a use amount ranged between 0.5 and 5.0 wt %, is one or more selected from the group consisting of methanol, ethanol, and glycol.

7. The waterborne heat-insulation coating composition as defined in claim 1, wherein the antifoaming agent, the leveling agent, the antibacterial agent, and the photostabilizer has a use amount ranged between 0.01 and 1.0 wt %, respectively; and
   the antifoaming agent is one or more selected from the group consisting of polysiloxane-polyether copolymer, octanol, tributyl phosphate, triphenyl phosphate, emulsified methyl silicone, emulsified phenylmethyl silicone, non-silicone mineral oil mixture containing hydrophobic particles, and modified polysiloxane;
   the leveling agent is one or more selected from the group consisting of acrylate copolymers and non-reactive polyethermodified polysiloxane;
   the antibacterial agent is a nitrite or/and a sodium fluoride; and
   the photostabilizer is a benzophenone-based organic matter or/and a benzotriazole-based organic matter.

8. A waterborne heat-insulation coating being made of the waterborne heat-insulation coating composition of claim 1.

* * * * *